United States Patent
Gilbert et al.

[19]

[11] Patent Number: 6,038,920
[45] Date of Patent: Mar. 21, 2000

[54] PRECIPITATION MEASURING SYSTEM

[75] Inventors: Richard Gilbert, Roxboro; Mario A. Sauvageau, Dollard-des-Ormeaux; Stephane Bourgeois, Verchéres, all of Canada

[73] Assignee: Meteoglobe Canada Inc., Pierrefonds, Canada

[21] Appl. No.: 09/105,157

[22] Filed: Jun. 26, 1998

[30] Foreign Application Priority Data

Jun. 27, 1997 [CA] Canada .................................... 2209116

[51] Int. Cl.⁷ ...................................................... G01W 1/00
[52] U.S. Cl. ...................................................... 73/170.23
[58] Field of Search ........................... 73/170.16, 170.17, 73/170.18, 170.19, 170.21, 170.22, 170.23, 862.625, 862.627, 862.632, 862.634

[56] References Cited

U.S. PATENT DOCUMENTS

| | | |
|---|---|---|
| 2,789,431 | 4/1957 | Wong . |
| 4,143,727 | 3/1979 | Jacobson . |
| 4,344,496 | 8/1982 | Langlais et al. . |
| 4,682,664 | 7/1987 | Kemp . |
| 4,726,435 | 2/1988 | Kitagawa et al. . |
| 4,893,506 | 1/1990 | Shyu et al. . |
| 5,048,331 | 9/1991 | Hattori et al. . |
| 5,220,971 | 6/1993 | Farr . |
| 5,293,007 | 3/1994 | Darst et al. . |

*Primary Examiner*—William Oen
*Attorney, Agent, or Firm*—McDermott, Will & Emery

[57] ABSTRACT

The precipitation measuring system is used for electronically measuring the amounts of rain, snow, hail or the like, with the use of a load cell. The system comprises a second frame mounted within a first frame. The second frame bears the collector and a load cell connects the second frame to the first frame. The load cell comprises a strain gauge bridge which is used to convert strain variations in the load cell into electrical conditions altering an electric current. These electrical variations correspond to weight variations occurring when the amount of precipitations in the collector varies and are then recorded by a recording device such as a computer. One advantage of the present invention is that the static and dynamic friction are eliminated, which greatly improves the precision and reliability of the system over the ones presently in operation. The calibration procedures are also simplified.

13 Claims, 6 Drawing Sheets

PRECIPITATION MEASURING SYSTEM

FIELD OF THE INVENTION

The present invention relates to a precipitation measuring system for electronically measuring the amounts of rain, snow, hail or the like, with the use of a load cell that is used as a weight sensor.

BACKGROUND OF THE INVENTION

Over the years, many kinds of precipitation collecting and measuring systems have been used. At first, the readings were taken by collecting the precipitation manually and by inserting them into a graduated cylinder. The need to operate such apparatuses in a more automated manner led to collectors using a spring balance which records its movements on a medium such as a paper scale. The further needs for fully automated collectors then led to optical encoder implements or electronic telemetric implements.

Although the construction of the systems periodically evolved throughout the years, they were not less mechanically complex, mainly because of the compatibility requirement with prior equipments and the need to continue the readings. To achieve readings with greater precision, it was necessary to deal with a considerable number of factors such as the static and the dynamic friction of the mobile parts, the linearity of the springs, and the sensibility of the parts to temperature variations.

SUMMARY OF THE INVENTION

The object of the present invention is to provide a precipitation measuring system having a greatly simplified mechanism by which the weight of the collected precipitations is transferred to a load cell that is used as a weight sensor.

More particularly, the present invention provides a precipitation measuring system comprising:

a first frame;

a load cell located within the first frame and having an upper end connected under an upper portion of the first frame, the load cell comprising at least one strain gauge bridge disposed thereon in a strain sensitive region to convert strain variations in the load cell into electrical variations;

a means for applying a potential to the strain gauge bridge;

a second frame connected under the load cell;

a precipitation collector connected over the second frame;

a counterweight connected to a lower portion of one among the collector and the second frame to maintain equilibrium of the collector; and recording means for recording the electrical variations produced by the strain gauge bridge.

One advantage of the present invention is that the static and dynamic friction are eliminated, which greatly improves the precision and reliability of the system over the ones presently in operation. The calibration procedures are also simplified.

A non restrictive description of preferred embodiments will now be given with reference to the appended drawings.

DESCRIPTION

Reference numerals

Figure 1:
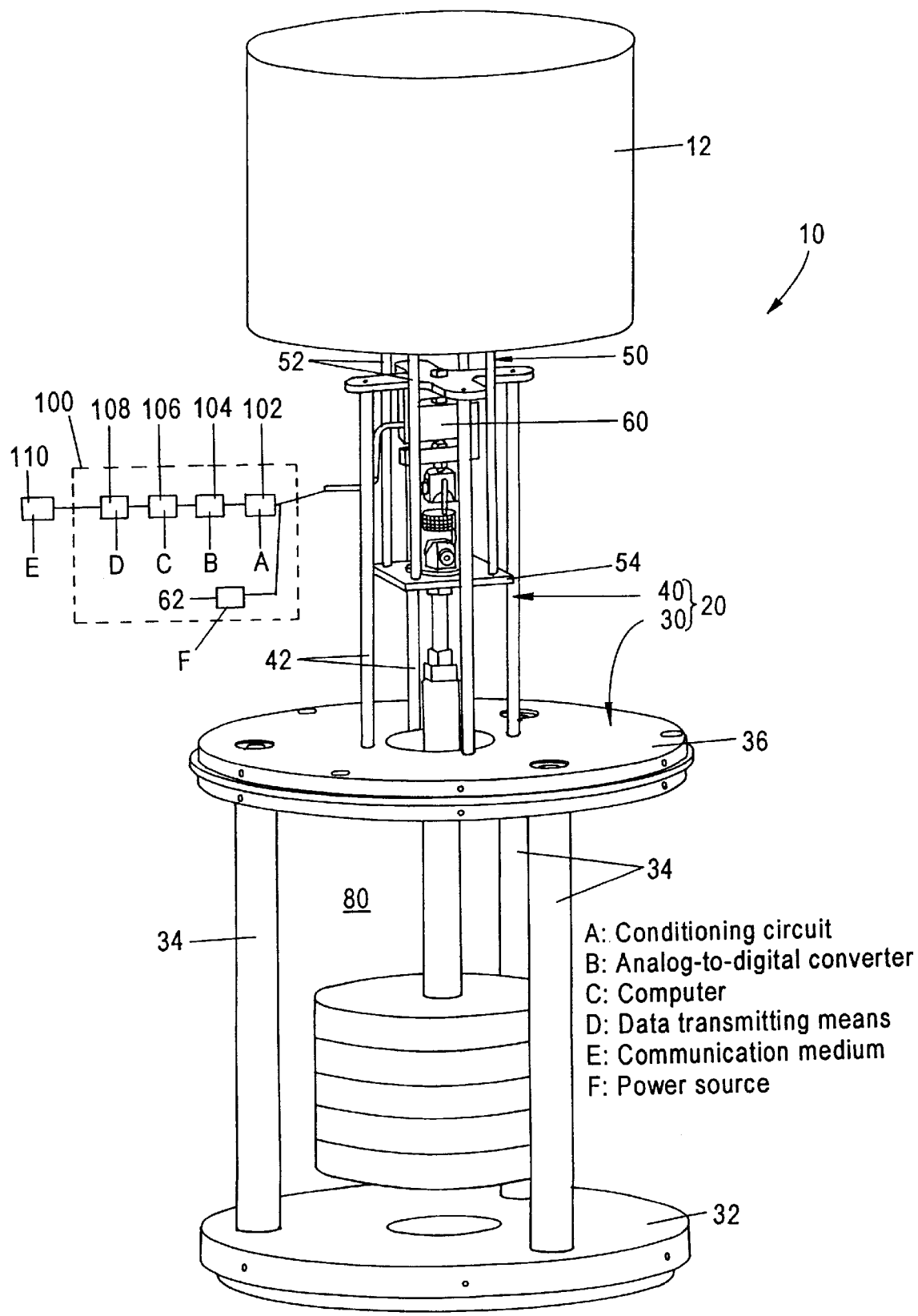
FIG. 1 is a perspective view of the precipitation measuring system according to a possible embodiment of the present invention.

The present description and the appended drawings use the following reference numerals:

10 precipitation measuring system
12 precipitation collector
13 cylinder
14 wind deflector
15 braces (of the wind deflector)
16 housing
20 first frame
30 lower portion (of the first frame)
32 base
34 legs
36 support surface (of the lower portion)
38 opening
40 upper portion (of the first frame)
42 rods (of the upper portion)
44 X-shaped linking element (of the upper portion)
50 second frame
52 rods (of the second frame)
54 lower support plate (of the second frame)
56 round linking element (of the second frame)
58 support (for the collector)
60 load cell
62 power source
66 swivel
68 swivel
70 spring
80 counterweight
84 toric weight
90 damping means
92 damping element
94 liquid bath
100 recording means
102 conditioning circuit
104 analog-digital converter
106 computer
108 data transmitting means
110 communication medium General description of the invention According to the present invention, the precipitation measuring system (10), hereinafter called "the system (10)", is used for measuring the amounts of rain, snow, hail or the like.

As shown in FIG. 1, the system (10) comprises a simplified mechanism for the weight transfer between a precipitation collector (12) and a load cell (60). It mainly comprises a first frame (20) on which is connected the upper end of the load cell (60). A spring (70) supports a second frame (50), itself supporting the precipitation collector (12) connected over it, which collects precipitations from the atmosphere. A counterweight (80,84) is added to the system (10) for preventing the collector (12) from toppling.

In accordance with the present invention, the load cell (60) is used to monitor the weight variations occurring when the amount of precipitations in the collector (12) varies. One or more strain gauge bridges are used in the load cell (60) to convert strain variations into electrical variations corresponding to the weight variations. These electrical variations are recorded by recording means (100).

Because the system has no part in which static or dynamic friction is occurring, the readings are precise and the system less subject to mechanical failures. As a result, the system (10) only requires a minimal human intervention.

First frame

The first frame (20) is rigidly attached to a fixed structure, such as the ground or a building. As apparent to a person skilled in the art, the first frame (20) is made of a rigid material and has a hollow shape suitable for accommodating the other elements of the system (10). The shape of the first frame (20) may of course differ from the one shown in the appended drawings.

The first frame (20) comprises a lower portion (30) and an upper portion (40) which is mounted over the lower portion (30). The lower portion (30) comprises a base (32) provided with three upright legs (34) for bearing a support surface (36). The upper portion (40) comprises at least three upright and spaced-apart rods (42), preferably four rods (42). Each rod (42) has a lower end solid with the support surface (36). The rods (42) are preferably evenly distributed around the central axis of the first frame (20).

With four rods (42), the upper ends of the rods (42) are preferably connected all together by means of an X-shaped linking element (44).

Load cell

The load cell (60) is a part made of a slightly resilient material. The load cell (60) is preferably S-shaped and provided with at least one strain sensitive region where a strain gauge bridge may be advantageously installed on the surface thereof for measuring strain variations that occur as the amount of precipitations in the collector (12) changes. An example of a suitable load cell (60) is the one commercially available under the trade name "60001" and manufactured by Sensortronics. Other models or shapes of load cells are of course suitable.

The radiometric nature of the strain gauge bridge greatly simplifies the automation of the system (10). As a side benefit, self calibration procedures can be implemented to further reduce the possible error sources, including resistive losses in the connecting cables.

In use, a bipolar excitation signal in the order of few volts is applied to the load cell (60) using a suitable power source (62), as apparent to a person skilled in the art. The electrical variations coming from the load cell (60) are in the order of a few millivolts.

The load cell (60) has its upper end connected to an upper portion of the first frame (20), more particularly to the X-shaped linking element (44).

Strain gauge bridges are sensible to rapid temperature variations. Care has then to be taken for reducing the temperature gradients as well as rapid heat transfers between parts of the system (10) and load cell (60). To achieve that goal, insulation plates (not shown) may be provided at the upper and lower attachments of the load cell (60). Alternatively, bolts made of an insulated material can be used. Teflon® is an example of an insulating material.

Figure 4:
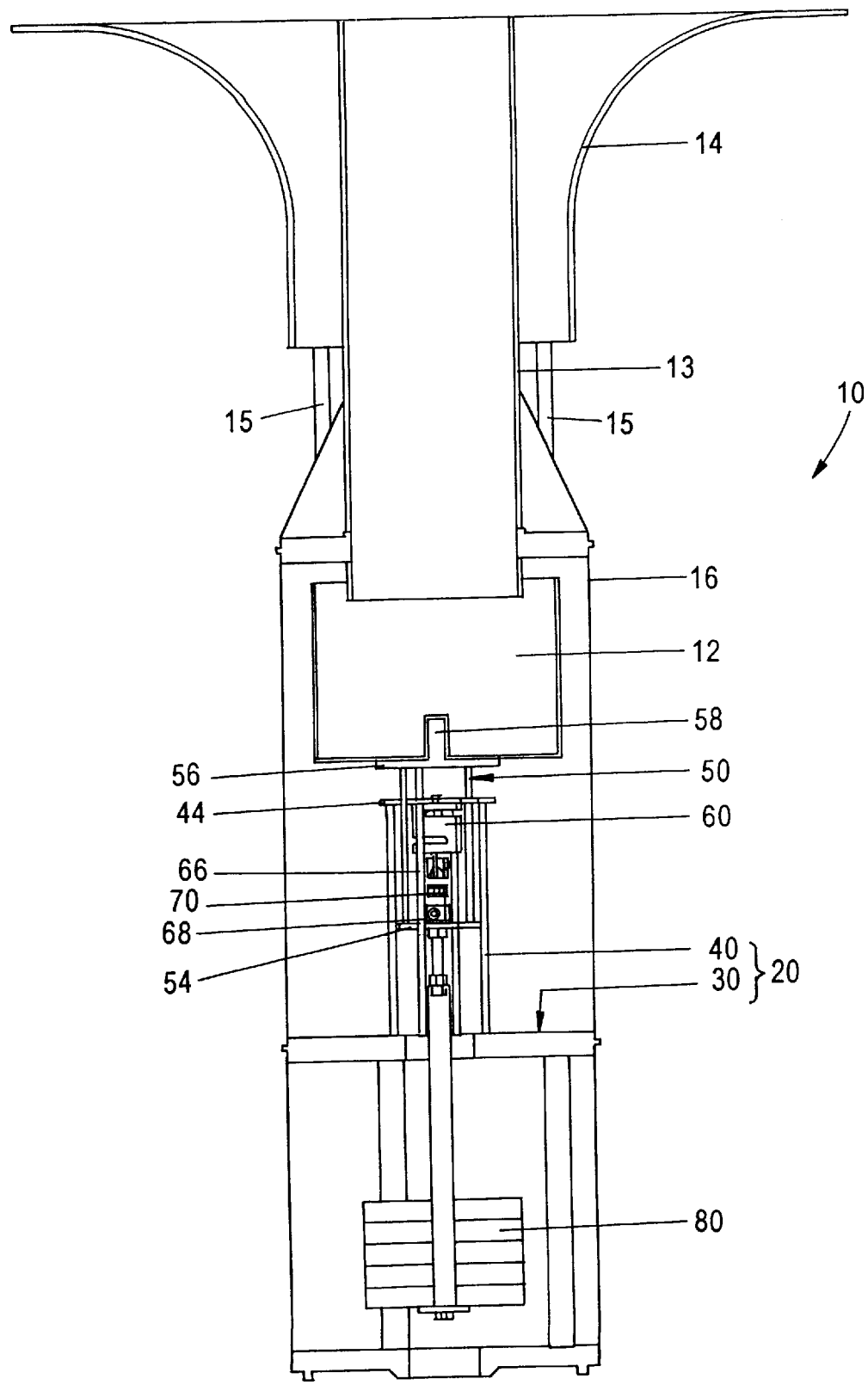
FIG. 4 is a side elevational view of the system shown in FIG. 1, showing the system with a housing and an overhead wind deflector, both in a cross section.

FIG. 4 shows the housing (16) of the system (10), which protects and insulates the load cell (60) from the surrounding environment. If necessary, the load cell (60) itself may be provided with a specific insulation cover (not shown).

Protection of the load cell

Figure 2:
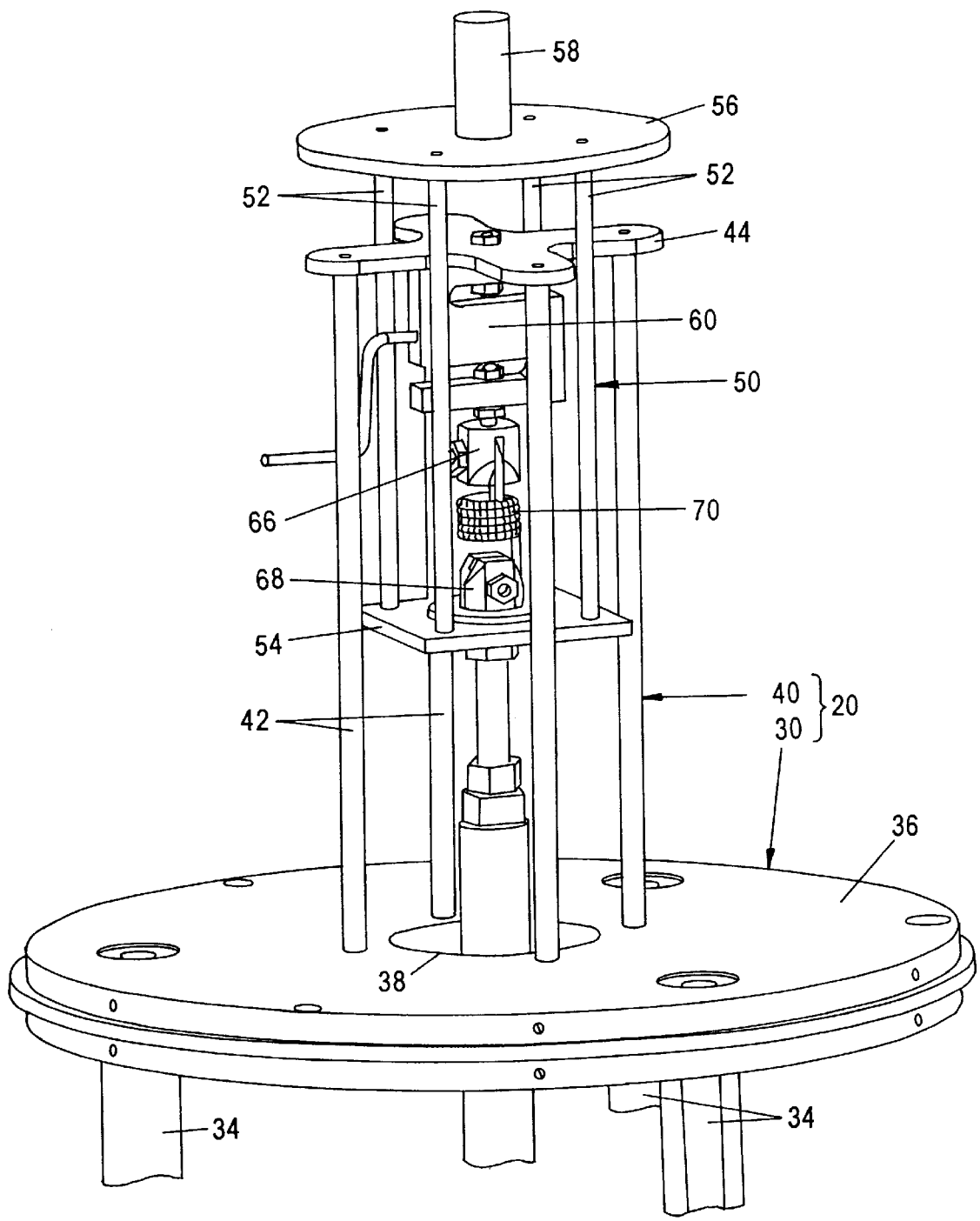
FIG. 2 is an enlarged perspective and partially broken view of the system shown in FIG. 1.

It is particularly advantageous to provide a pair of swivels (66,68) under the load cell (60) for substantially eliminating turning moments due to unbalanced loads. These turning moments generate the most common errors in load cell readings. As best shown in FIG. 2, one swivel is set in one direction and the other is set at right angle with respect to the first one. The main task of the swivels (66,68) is to prevent the second frame (50) from touching the upper portion (40) of the first frame (20). However, a brief contact may happen on some occasions, for instance during strong winds, but this does not have an impact on the results.

Both swivels (66,68) may be linked together by a spring (70), such as a helicoidal spring. Ball or roller bearings (not shown) can be used for reducing friction of the swivels to a minimum. Although it may be possible to provide the system (10) without a spring, the spring (70) is very useful for preventing very sudden overloads or shocks to the load cell (60) that could affect the calibration of the system (10). Such events are possible during inappropriate manipulations of the system (10) by the users or during maintenance. The spring (70) can also be used without the swivels (66,68).

Another important feature of the present invention is that the system (10) can be designed to prevent any damage to the load cell (60) or to the spring (70) in case of a major overload. Referring now to FIG. 2, the second frame (50) moves downwards as more and more weight is applied thereon. This displacement is due to the elongation of the spring (70), with the exception of the very small deformation of the load cell (60). If the weight increases further, the round linking element (56) will eventually touch the X-shaped linking member (44) and stop the vertical movement of the second frame (50). Therefore, any subsequent increase of the weight will have no effect on the load cell (60) or the spring (70).

Second frame

The second frame (50) is set within the upper portion (40) of the first frame (20) and is operatively connected under the load cell (60), more particularly by means of the pair of swivels (66,68).

As apparent to a person skilled in the art, the second frame (50) is made of a rigid material. It comprises at least three rods (52) for stability, preferably four in the illustrated embodiments. The shape of the second frame (50) may of course differ from the square shape shown in the appended drawings. The upper end of the rods (52) are connected to a round linking element (56) located above the X-shaped linking element (44). The round linking element (56) bears a support (58) for holding the precipitation collector (12).

Precipitation collector

The precipitation collector (12) is a recipient where are sent all the precipitations to be measured. The collector (12) is connected, usually removably connected, to the second frame (50) by means of the support (58) and is emptied periodically by a technician or by an automated device (not shown).

To efficiently collect solid precipitations such as snow in spite of winds and turbulences, the collector (12) is generally used with an overhead wind deflector such as the one illustrated in FIG. 4, showing an example of one possible embodiment. Such wind deflector (14) is known as a Nipher type and is connected over the housing (16). The wind deflector (14) is preferably supported by means of three vertical braces (15), as shown in FIG. 4. Other types of wind deflectors are of course possible. The precipitations are guided towards the collector (12) by means of a vertical cylinder (13).

During cold weather, a saline bath or an additive such as ethylene glycol is poured into the collector (12) for melting the solid precipitations.

Figure 5:
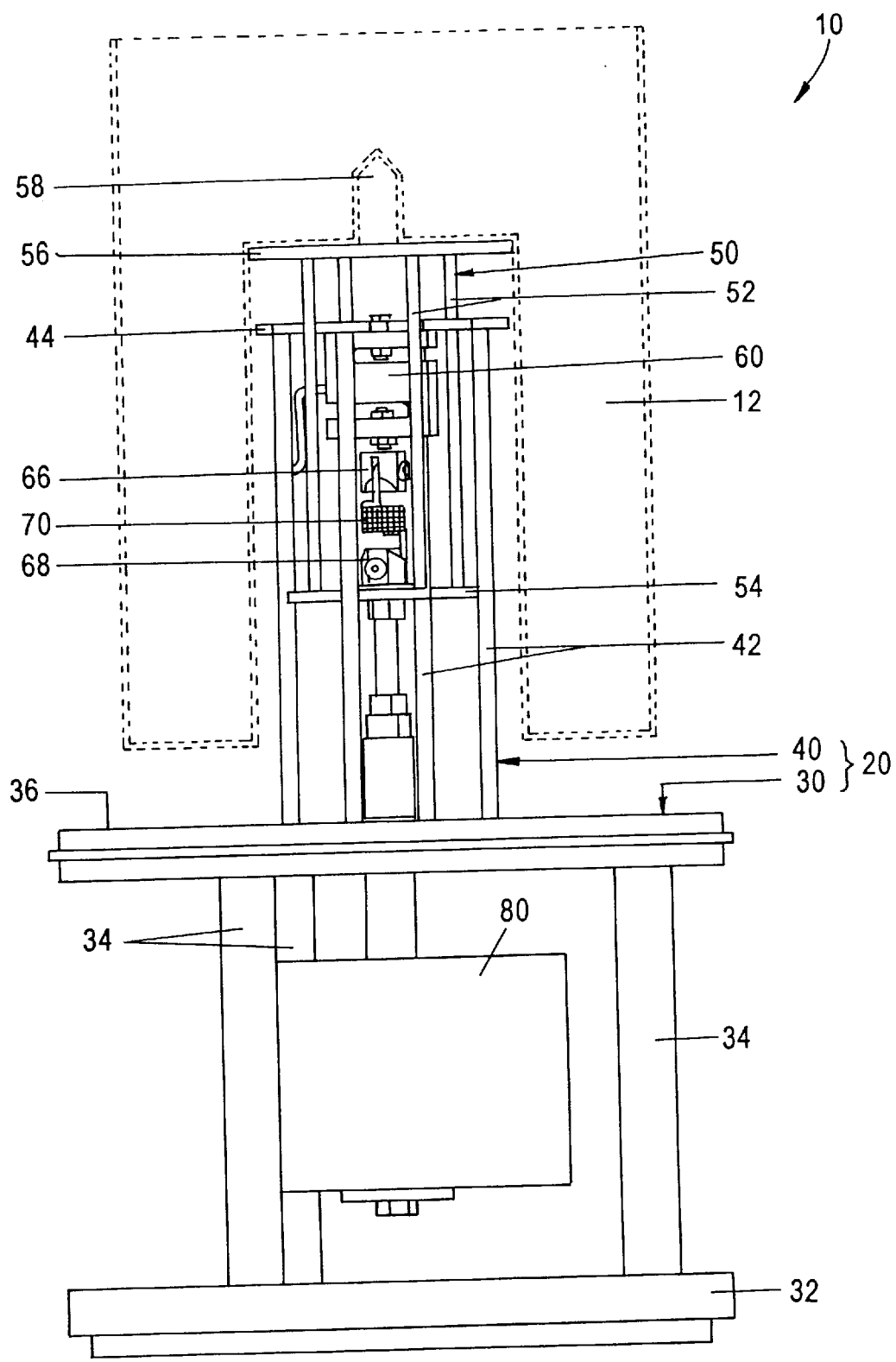
FIG. 5 is a side elevational view of the system according to another possible embodiment of the present invention, showing an alternative embodiment of the collector.
Figure 6:
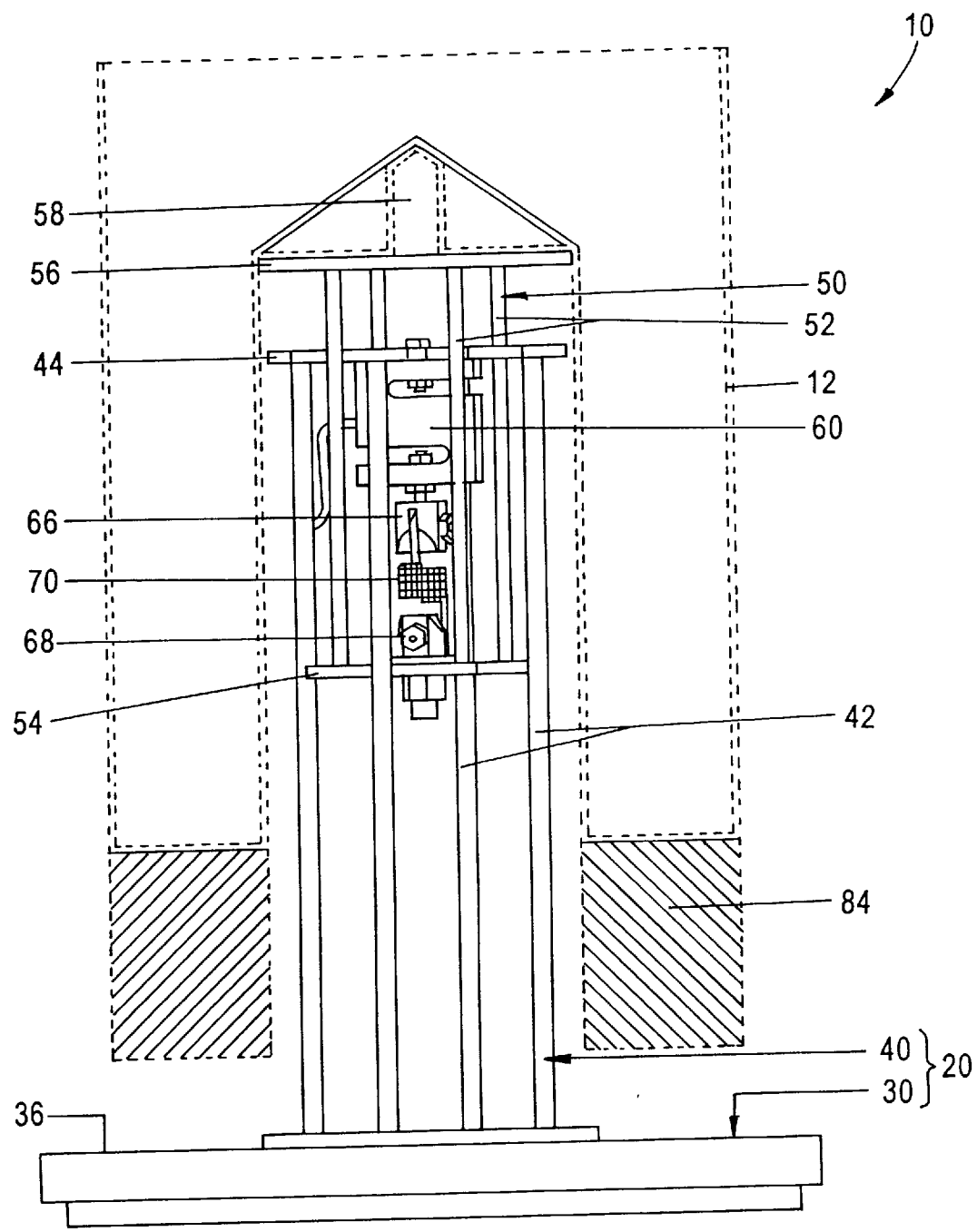
FIG. 6 is a side elevational view of the system shown in FIG. 5, showing the collector with a toric weight.

As shown in FIGS. 5 and 6, the collector (12) may be also annular and surround the other parts of the system (10). This lowers the center of gravity to a point where the liquid in the collector (12) is itself acting as the counterweight.

Counterweight

As aforesaid, a counterweight (80) is added to the system (10), such as in the form of a pendulum shown in FIGS. 1, 3, 4 and 5, or as toric weight (84), as it is shown in FIG. 6, the latter allowing a very compact construction. The toric weight (84) may be made of any heavy material.

The purpose of the counterweight (80) is to maintain the equilibrium of the system (10), more specifically the equilibrium of the second frame (50) and the collector (12), if the design requires that the center of gravity be lowered to prevent the collector (12) from toppling.

Recording means

The recording means (100) are preferably comprising an electronic circuit sending the signal to a computer (106). Of course, many other kinds of recording means (100), including manual recording from a voltmeter, are also possible depending on the users' needs.

Preferably, the recording means (100) converts the electrical variations from the load cell (60) into readable units by a signal conditioning circuit (102) which amplifies and modifies the signal. The recording means (100) preferably control the power source (62) to the load cell (60). The conditioned signal will be within the range of an analog-to-digital converter (104) sending the then converted signal to a computer (106). The computer (106) further converts the signal by linear gain conversion and offset functions transposing values in units of precipitation amounts, such as inches or millimeters.

The forces measured in the load cell (60) are subjected to variations due to vibrations, the pumping effect of the wind, the movements of the counterweight (80) and the spring (70) and the induced currents from the 50 or 60 Hz power supply. All these variations have to be filtered with the use of appropriate algorithms provided in the computer (106), either in a software or a hardware, so that the readings be stable even if the system (10) is working for instance in very bad weather conditions.

The recording means (100) may further comprise data transmitting means (108) for transmitting the recorded data to another location. The data transmitting means (108) is an electronic interface, such as a modem, connected to a communication medium, such as a phone line. The data transmitting means (108) may also be used for transmitting data from other sensors that are usually found in a meteorologic station.

Calibration of the system

Calibration of the system (10) can be done very easily with electronic circuits because the readings are modified electronically and are almost not affected by mechanical errors, such as the ones occurring hitherto with conventional systems. The calibration is preferably done by pouring known quantities of liquid into the collector (12). The output voltage readings will then allow to obtain a conversion formula provided by a linear regression technique for instance.

Preferably, the effects of temperature on the readings are taken into account and included into the conversion formula. Means for monitoring the temperature during the operation of the system (10) may be provided. The effects are evaluated when the collector (12) is empty and when the collector (12) is full. The evaluation of the effects represents the overall effect of the temperature over the offset in the load cell (60) and the gain in the electronic circuits. All these calibration parameters may be stored in a semi-permanent memory (EEPROM) so that the system (10) is always ready whenever it is switched on.

Damping means

Figure 3:
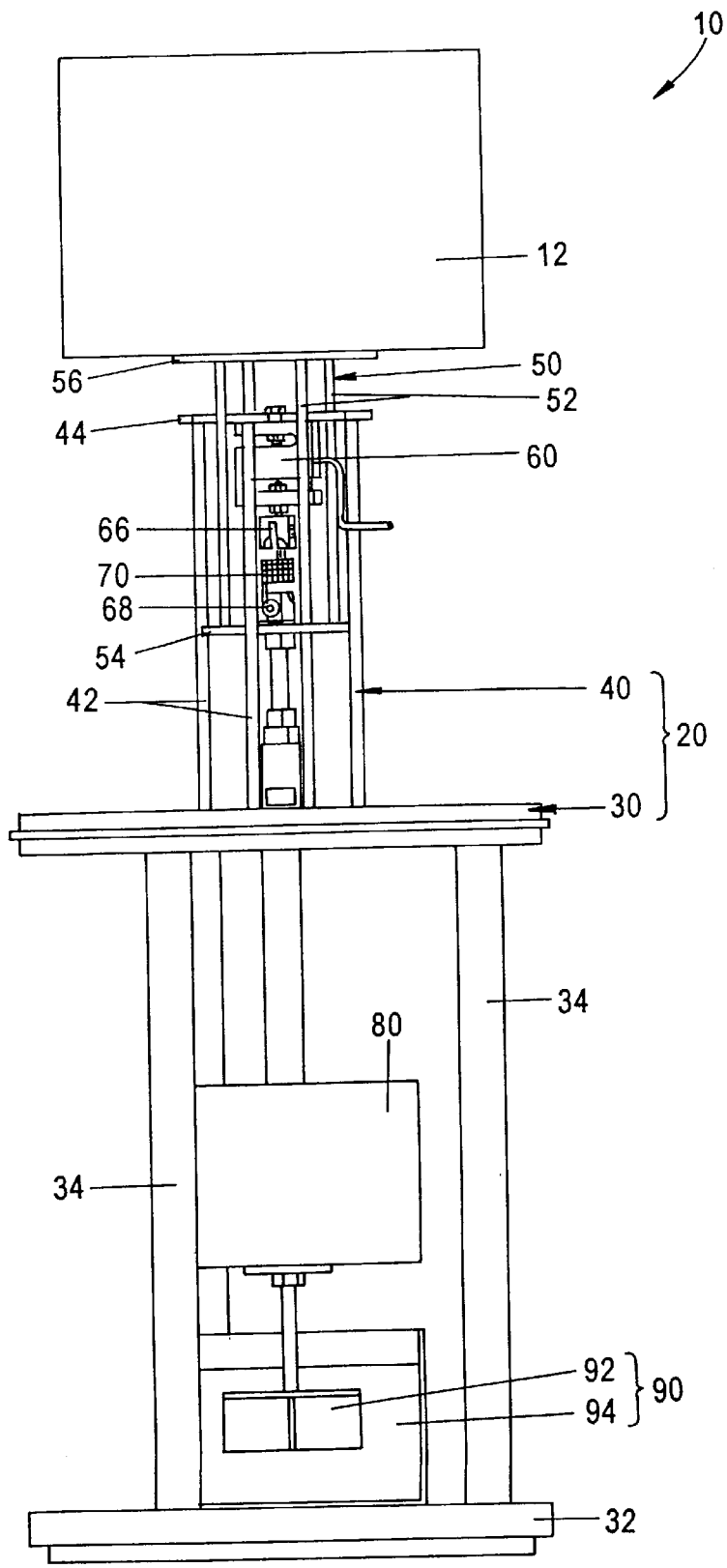
FIG. 3 is a side elevational view of the system shown in FIG. 1, further comprising a damper.

Damping means (90) are provided in order to accelerate the damping of the possible oscillations of the counterweight means (80). The damping means (90) is preferably connected to the counterweight (80), as shown in FIG. 3. According to a preferred embodiment, the damping means (80) comprises a damping element (92) immersed in a non-freezing liquid bath (94), such as a bath of ethylene glycol. The damping element (92) may be cross-shaped. Other constructions of the damping means (90) are also possible, as it is apparent to a person skilled in the art.

Scope of the present invention

Although preferred embodiments of the invention have been described in detail herein and illustrated in the accompanying drawings, it is to be understood that the invention is not limited to these precise embodiment and that various changes and modifications may be effected therein without departing from the scope or spirit of the invention.

What is claimed is:

1. A precipitation measuring system comprising:

a first frame;

a load cell located within the first frame and having an upper end connected under an upper portion of the first frame, the load cell comprising at least one strain gauge bridge disposed thereon in a strain sensitive region to convert strain variations in the load cell into electrical variations;

a means for applying a potential to the strain gauge bridge;

a second frame connected under the load cell;

a precipitation collector connected over the second frame;

a counterweight connected to a lower portion of one among the collector and the second frame to maintain equilibrium thereof; and recording means for recording the electrical variations produced by the strain gauge bridge.

2. A precipitation measuring system according to claim 1, wherein the load cell is S-shaped.

3. A precipitation measuring system according to claim 2, further comprising swivel means connected between the load cell and the second frame.

4. A precipitation measuring system according to claim 3, wherein the swivel means comprises a pair of swivels located at substantially right angle with respect to each other.

5. A precipitation measuring system according to claim 4, further comprising a spring connected between the swivels.

6. A precipitation collector according to claim 5, further comprising a spring connected between the load cell and the second frame.

7. A precipitation measuring system according to claim 1, wherein the first frame comprises a lower portion topped by four upright and spaced-apart rods, each rod having an upper end that is joined to all others by an X-shaped linking element.

8. A precipitation measuring system according to claim 7, wherein the second frame comprises four upright and spaced-apart rods, each rod of the second frame having a lower end connected to a lower support plate and an upper end connected to an upper support plate, the lower support plate being embedded within the first frame.

9. A precipitation measuring system according to claim 1, further comprising a damper connected to the counterweight to damp oscillations of the same.

10. A precipitation measuring system according to claim 9, wherein the damper comprises a damping element immersed in a non-freezing liquid bath.

11. A precipitation measuring system according to claim 1, further comprising data transmitting means for transmitting data recorded by the recording means to another location via an electronic communication medium.

12. A precipitation measuring system according to claim 1, further comprising a wind deflector enclosing the collector.

13. A precipitation measuring system according to claim 12, wherein the wind collector is a Nipher type wind collector.

* * * * *